UNITED STATES PATENT OFFICE.

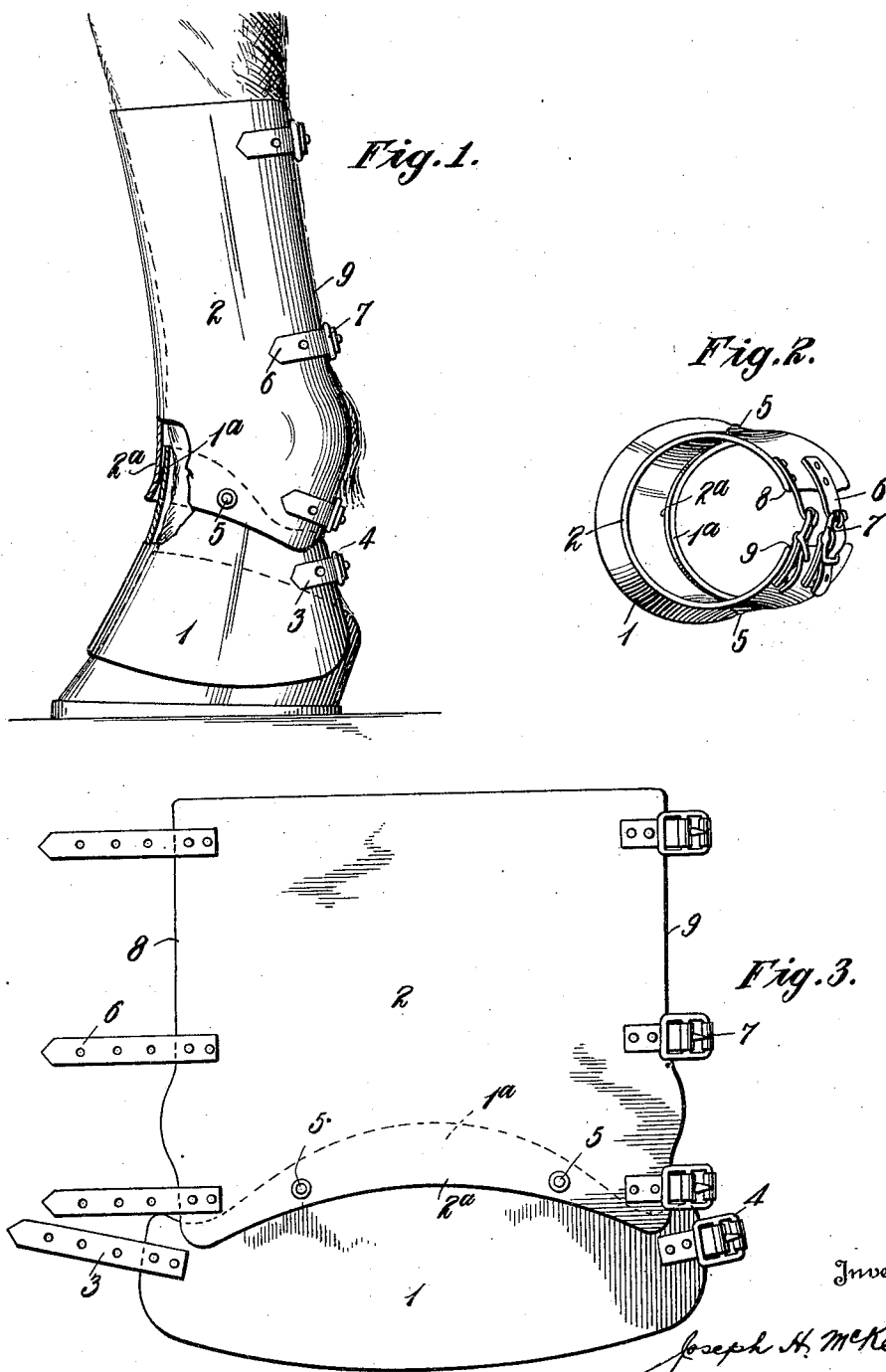

JOSEPH H. McKENZIE, OF BEAUMONT, TEXAS.

HORSE-BOOT.

1,395,689.   Specification of Letters Patent.   Patented Nov. 1, 1921.

Application filed January 24, 1921. Serial No. 439,520.

*To all whom it may concern:*

Be it known that I, JOSEPH H. McKENZIE, a citizen of the United States, residing at Beaumont, in the county of Jefferson and State of Texas, have invented certain new and useful Improvements in Horse-Boots, of which the following is a specification.

The object of my invention is to provide a boot for horses to cover and protect not only the hoof and pastern joint but also the fetlock joint and practically the entire fore-leg below the knee, and which will permit free use of the ankle joint without hindrance or chafing.

In the accompanying drawings,

Figure 1 is a side elevational view, partially in section, showing my improved boot applied to a horse's leg; Fig. 2 is a top plan view of the boot shown in Fig. 1, with parts omitted for the sake of clearness; and, Fig. 3 is a plan view of the horse-boot blank before being shaped to the form in which it is used.

My invention comprises a horse-boot formed of two over-lapping sections 1 and 2, flexibly connected at their overlapping ends 1ª and 2ª. The hoof section 1 is of a shape and size to cover the upper portion of the hoof and the flesh adjacent thereto, and to completely or nearly encircle the hoof. The hoof section may be secured in position by one or more straps 3 and buckles 4, attached to its opposite rear edges.

The front part of the section 1 is extended upwardly, as at 1ª, to cover and protect the corona of the hoof and the pastern joint.

The leg section 2 is made sufficiently long to extend from just below the knee to meet and overlap the hoof-section 1, throughout substantially its entire width or circumference. The lower end 2ª of the leg section encircles the upper end 1ª of the hoof-section loosely, to form a flexible joint between the sections and to permit the free and unrestrained use of the ankle joint when the boot is worn. To the same end, the sections 1 and 2 are not connected in any way at either front or back. The sections are hingedly connected, however, at two opposite points on the sides by rivets 5, or other suitable pivotal connecting means. This construction allows sufficient vertical play of the edges of the sections forward and rearward of the connecting points to render the joint flexible without the use of flexible connecting straps or bands at the front or back of the boot, and the overlapping of the edges of the boot-sections provides against the rubbing or chafing of the leg or ankle by the lower end of the leg-section, thus obviating a defect commonly found in boots for horses.

The boot-sections 1 and 2 are preferably formed of leather, fashioned and arranged as illustrated in Fig. 3, and are shaped and pressed, in a mold or in any other suitable way, to the proper form. When shaped and applied to a horse's leg, the leg-section 2 may completely cover the leg at the back as well as at the front, but it is preferably used as shown in Fig. 2, with the edges 8 and 9 slightly separated to provide for ventilation and to prevent over-heating of the leg, which might occur if the edges 8 and 9 were brought together closely.

I claim:

1. A horse-boot comprising an upper section to encircle and cover the leg of a horse and extended downwardly to the region of the pastern joint and the fetlock joint, a lower section to encircle and cover the upper part of the hoof and the adjacent flesh, the lower end of the upper section and the upper end of the lower section overlapping, means for hingedly connecting the overlapping ends at the sides of the leg, and means for removably securing the sections in place.

2. A horse-boot comprising a lower part to fit over the upper part of the hoof and extended upward to cover the pastern joint, an upper part to cover and protect the leg and extended downwardly to overlap the top of the lower part at front, back and sides, and means for hingedly connecting the upper and lower parts at their overlapping sides.

3. A horse-boot comprising a hoof-section to encircle and cover the hoof and the flesh adjacent to substantially the entire upper edge of the hoof, the hoof-section being extended upward at its front to cover the pastern joint, a leg-section to encircle and cover the leg from slightly below the knee to the pastern and fetlock joints, the leg-section at its lower end overlapping and loosely encircling the upper end of the hoof-section throughout its width or circumference and being free to move relative thereto at front and back, means for pivotally connecting the overlapping ends of the leg and hoof sections at opposite sides, and means on each of the sections for removably securing it in place upon the horse's leg.

In testimony whereof I affix my signature.

JOSEPH H. McKENZIE.